(12) United States Patent
Yu et al.

(10) Patent No.: US 11,402,326 B2
(45) Date of Patent: Aug. 2, 2022

(54) SYSTEMS AND METHODS FOR MULTI-WAVELENGTH SCATTERING BASED SMOKE DETECTION USING MULTI-DIMENSIONAL METRIC MONITORING

(71) Applicant: Hong Kong Applied Science and Technology Research Institute Co., Ltd., Shatin (HK)

(72) Inventors: Zhinan Yu, Shatin (HK); Chun Chung Chan, Tseuen Wan (HK); Jiangquan Mai, Shatin (HK); Fangyi Shi, Hung Hom (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 84 days.

(21) Appl. No.: 17/033,584

(22) Filed: Sep. 25, 2020

(65) Prior Publication Data

US 2022/0099572 A1 Mar. 31, 2022

(51) Int. Cl.
*G01N 21/53* (2006.01)
*G08B 17/107* (2006.01)

(52) U.S. Cl.
CPC .......... *G01N 21/53* (2013.01); *G08B 17/107* (2013.01)

(58) Field of Classification Search
CPC ............................. G01N 21/53; G08B 17/107
(Continued)

(56) References Cited

U.S. PATENT DOCUMENTS 6,011,478 A 1/2000 Suzuki et al.
8,879,060 B2 11/2014 Kwok et al.
(Continued)

FOREIGN PATENT DOCUMENTS

CN 1987426 A 6/2007
CN 101677771 B 3/2010
(Continued)

OTHER PUBLICATIONS

Patent Cooperation Treaty, International Search Report and Written Opinion issued for PCT Application No. PCT/CN2020/120693, dated June 10, 2021, 9 pages.
(Continued)

*Primary Examiner* — Tri T Ton
(74) *Attorney, Agent, or Firm* — Norton Rose Fulbright US LLP

(57) ABSTRACT

Systems and methods in which multi-dimensional metric monitoring is used with respect to multi-wavelength scattering for smoke detection are described. A multi-dimensional metric may dynamically track a slope of a relationship between scattered light of multiple wavelengths of scattered light being monitored. A multi-dimensional metric monitoring smoke detection algorithm may utilize multi-dimensional thresholds with respect to monitoring of the multi-dimensional metric for initiating a fire alarm and resetting the fire alarm. An optical measuring chamber utilized for providing multi-wavelength scattering signals utilized in deriving a multi-dimensional metric for smoke detection may be configured for wide-scattering-angle signal collection, such as using a light trapping sub-chamber having a light-guide diaphragm assembly configured for wide-scattering-angle signal collection.

19 Claims, 5 Drawing Sheets

(58) Field of Classification Search
USPC .................................................. 356/300–343
See application file for complete search history.

(56) References Cited

U.S. PATENT DOCUMENTS

| | | | |
|---|---|---|---|
| 8,890,700 | B2 | 11/2014 | Cole |
| 9,204,809 | B2 | 12/2015 | Gu et al. |
| 9,295,420 | B2 | 3/2016 | Zhang et al. |
| 9,468,403 | B2 | 10/2016 | Ho et al. |
| 9,541,501 | B2 | 1/2017 | Allemann et al. |
| 9,652,957 | B2 | 5/2017 | Urrutia et al. |
| 9,685,058 | B2 | 6/2017 | Schmidt et al. |
| 9,875,631 | B2 | 1/2018 | Mittleman et al. |
| 9,924,894 | B2 | 3/2018 | Zhang et al. |
| 9,931,076 | B2 | 4/2018 | Gu |
| 10,001,438 | B2 | 6/2018 | Wang et al. |
| 10,058,255 | B2 | 8/2018 | Cheng |
| 10,105,089 | B2 | 10/2018 | Leung et al. |
| 10,161,861 | B2 | 12/2018 | Zhang et al. |
| 10,215,689 | B2 | 2/2019 | Wang et al. |
| 2010/0249617 | A1 | 9/2010 | Leung et al. |
| 2011/0245627 | A1 | 10/2011 | Leung et al. |
| 2012/0176599 | A1 | 7/2012 | Leung et al. |
| 2013/0303921 | A1 | 11/2013 | Chu et al. |
| 2014/0152986 | A1* | 6/2014 | Trainer .............. G01N 15/0211 356/336 |
| 2018/0149590 | A1* | 5/2018 | Erdtmann .............. G01N 21/53 |
| 2019/0197857 | A1 | 6/2019 | Duric et al. |
| 2020/0025611 | A1 | 1/2020 | Mai et al. |

FOREIGN PATENT DOCUMENTS

| | | |
|---|---|---|
| CN | 101872389 A | 10/2010 |
| CN | 102613966 B | 8/2012 |
| CN | 102697487 B | 10/2012 |
| CN | 102727220 B | 10/2012 |
| CN | 103196888 B | 7/2013 |
| CN | 103876748 B | 6/2014 |
| CN | 103996262 A | 8/2014 |
| CN | 104013389 B | 9/2014 |
| CN | 104146692 B | 11/2014 |
| CN | 104267015 B | 1/2015 |
| CN | 104392577 A | 3/2015 |
| CN | 104958075 B | 7/2017 |
| CN | 108323181 A | 7/2018 |
| CN | 105725998 B | 8/2018 |
| CN | 108885170 A | 11/2018 |
| CN | 109923415 A | 6/2019 |
| CN | 109964104 A | 7/2019 |
| CN | 111179540 A | 5/2020 |
| WO | WO-2015036204 A1 | 3/2015 |
| WO | WO-2020064935 A1 | 4/2020 |

OTHER PUBLICATIONS

Deng, T., et al. "Dual-wavelength optical sensor for measuring the surface area concentration and the volume concentration of aerosols." Sens. Actuators B Chem, vol. 236, pp. 334-342, Nov. 2016.

* cited by examiner

SYSTEMS AND METHODS FOR MULTI-WAVELENGTH SCATTERING BASED SMOKE DETECTION USING MULTI-DIMENSIONAL METRIC MONITORING

TECHNICAL FIELD

The present invention relates generally to smoke detection and, more particularly, to techniques for multi-wavelength scattering based smoke detection using multi-dimensional metric monitoring.

BACKGROUND OF THE INVENTION

Smoke detectors have been widely used in homes, businesses, and other properties to provide automated alerting of the potential existence of a fire. Although smoke detectors may implement various configurations, they typically comprise a housing with at least one smoke-inlet aperture and a detector unit accommodated within the housing adapted for detecting the presence of smoke in the air entering the smoke-inlet aperture. An electronic control connected to the detector unit may be configured to output a warning and/or an alarm if smoke is detected within the detector unit.

The detector unit of some smoke detectors may, for example, comprise an optical measuring chamber having a light-emitting diode and corresponding photosensor, wherein the optical measuring chamber is shielded against ambient light but permeable to smoke to be detected. An electronic control unit is connected to the light-emitting diode and the photosensor and is configured to initiate a warning and/or alarm if a minimum concentration of smoke is present within the optical measuring chamber.

Some smoke detectors implementing an optical measuring chamber use two differently colored light-emitting diodes and a photosensor in one or two scattered-light arrangements. In operation, these smoke detectors perform an evaluation with respect to the particle size of particles within the air entering the smoke-inlet aperture of the optical measuring chamber. For example, by means of an evaluation of the respective colored scattered light received from the photosensor, the particle size of smoke particles within the optical measuring chamber may be determined. In one example, U.S. Pat. No. 8,890,700B2, the disclosure of which is incorporated herein by reference, uses a ratio between the signals from the two wavelengths with respect to a static threshold to determine the presence of particles having a size indicative of smoke. In another example, CN104392577A, the disclosure of which is incorporated herein by reference, uses an algorithm and a metric based on signals from two wavelengths of scattered light with respect to a static threshold to determine the presence of particles having a size indicative of smoke. In yet another example, U.S. Pat. No. 9,541,501B2, the disclosure of which is incorporated herein by reference, uses two different wavelength light sources disposed to provide narrow scattering angle signal collection to determine the presence of particles having a size indicative of smoke. In still another example, U.S. Pat. No. 9,685,058B2, the disclosure of which is incorporated herein by reference, uses two different wavelength light sources disposed to provide narrow scattering angle signal collection to obtain a metric incorporating signals from two wavelengths of scattered light used with respect to static thresholds to determine the presence of particles having a size indicative of smoke.

The foregoing smoke detector configurations, although generally effective at detecting smoke, are prone to false alarms. The smoke detectors may, for example, initiate an alarm in the presence of steam (e.g., steam from cooking, bathing, etc.), non-fire-based smoke (e.g., vapor from heated cooking oil, smoke from overcooked food, etc.), and/or similar non-emergency scenarios. Such false alarms result in annoyance and dissatisfaction for individuals for which the smoke alarms are to provide protection as well as the first responders, such as firefighters, that are tasked with responding to alarms. Moreover, the static metrics used by the smoke detectors typically result in long resetting times after a fire extinguished. In light of the proclivity for false alarms, some countries are beginning to include requirements for smoke detectors to prevent false alarms, such as due to cooking nuisance, in related standards.

Techniques to overcome the false alarms by the foregoing smoke detector configurations have included adding additional sensors to the smoke detector. For example, carbon monoxide sensors, carbon dioxide sensors, temperature sensors, and/or humidity sensors have been added to smoke detectors in an effort to quell the false alarms. However, the complexity and manufacturing cost are increased accordingly.

BRIEF SUMMARY OF THE INVENTION

The present invention is directed to systems and methods in which multi-dimensional metric monitoring is used with respect to multi-wavelength scattering for smoke detection. A dynamic metric having multiple dimensions utilized according to embodiments of the invention may be derived from multi-wavelength scattering signals obtained from an optical measuring chamber of a smoke detector configured according to concepts herein. For example, a multi-dimensional metric of embodiments may dynamically track a slope of a relationship between scattered light of the multiple wavelengths of scattered light being monitored. In operation according to embodiments of the invention, an algorithm for initiating a fire alarm and/or resetting the fire alarm may be based on monitoring the multi-dimensional metric, wherein false alarms are avoided and alarm resetting times after a fire is extinguished are shortened as compared to traditional implementations. Moreover, smoke detection using a multi-dimensional metric in accordance with concepts of the present invention may facilitate reliable alarm initiation without the need for additional sensors and/or other measurements for excluding false alarms and similar nuisances.

In accordance with some embodiments, the multiple wavelengths of scattered light utilized for smoke detection may include blue and near-infrared (NIR) wavelengths of light. In an example embodiment in which blue and NIR scattered light is being monitored, a multi-dimensional metric according to concepts herein may dynamically track a slope of a value calculated from blue scattered light intensity and NIR scattered light intensity. For example, the value tracked by a multi-dimensional metric of embodiments may comprise a ratio of the blue scattered light intensity to the NIR scattered light intensity (referred to herein as a Blue-to-IR ratio), whereby monitoring of the multi-dimensional metric provides information regarding a changing trend of the metric Blue-to-IR ratio.

A multi-dimensional metric monitoring smoke detection algorithm of embodiments may utilize multi-dimensional thresholds with respect to monitoring of the multi-dimensional metric for initiating a fire alarm and resetting the fire alarm. For example, a first multi-dimensional threshold may be utilized in combination with monitoring of a multi-dimensional metric (e.g., slope of Blue-to-IR ratio) for identifying fire smoke and excluding nuisances. Additionally or alternatively, a second multi-dimensional threshold may be utilized in combination with monitoring of a multi-dimensional metric (e.g., slope of Blue-to-IR ratio) for resetting after a fire extinguished.

An optical measuring chamber utilized for providing multi-wavelength scattering signals utilized in deriving a multi-dimensional metric for smoke detection is configured for wide-scattering-angle signal collection according to embodiments of the invention. For example, an optical measuring chamber of embodiments may comprise a light trapping sub-chamber having a light-guide diaphragm assembly inside the smoke chamber configured for wide-scattering-angle signal collection, such as to provide for collection of consecutive data points with sufficient signal and eliminated angle dependence to facilitate multi-dimensional metric monitoring. In operation according to embodiments, a light trapping sub-chamber where light scattering occurs may provide for collection of scattered light from a scattering-angle range of 45° to 90°.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
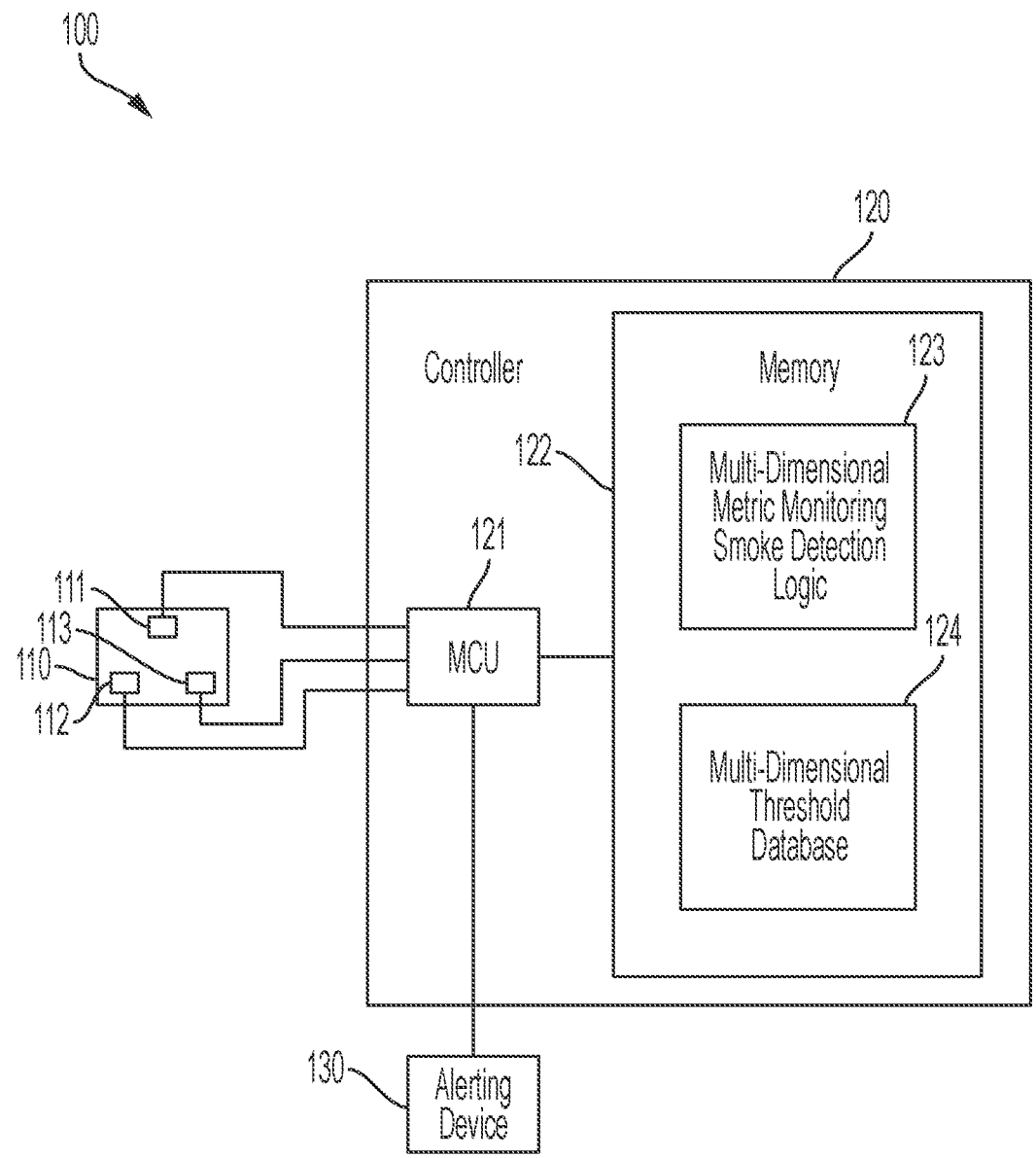
FIG. 1 shows a smoke detector configured for multi-dimensional metric monitoring with respect to multi-wavelength scattering for smoke detection according to embodiments of the present invention.

FIG. 1 shows smoke detector 100 configured for multi-dimensional metric monitoring with respect to multi-wavelength scattering for smoke detection. In the example of FIG. 1, smoke detector 100 includes optical measuring chamber 110, controller 120, and alerting device 130 operative cooperatively to provide smoke detection and alarming, such as for alerting individuals in the presence of fire. As will be better understood from the description below, smoke detector 100 of embodiments provides multi-wavelength based smoke detection configured for alarm determination, nuisance exclusion, and/or alarm resetting.

Optical measuring chamber 110 of embodiments provides a chamber in which photosensor 111 is substantially protected from ambient light of an environment in which smoke detector 100 is disposed. For example, optical measuring chamber 110 may comprise a light opaque housing incarcerating photosensor 111 and light sources 112 and 113, wherein orifices (not shown) through which air to be sampled is admitted are baffled or otherwise configured to block external light from entering the interior of the optical measuring chamber.

Optical measuring chamber 110 of smoke detector 100 provides an environment in which photosensor 111 is operable to detect light originating from light sources 112 and 113 that is scattered by particles present within the optical measuring chamber. Light sources 112 and 113 may, for example, comprise one or more lights (e.g., light emitting diodes (LEDs), lamps, etc.) configured to output selected wavelengths of light. In accordance with embodiments of the invention, light sources 112 and 113 each emit a different selected wavelength of light (e.g., one of light sources 112 and 113 may emit blue light having a wavelength in the range of 380 nm to 500 nm and the other of light sources 112 and 113 may emit near infrared (NIR) light having a wavelength in the range of 780 nm to 1,100 nm). Embodiments of the invention may, for example, utilize light sources from which a first wavelength of light is emitted in the range of 400 to 500 nm and a second wavelength of light is emitted in the range of 800 to 900 nm. Photosensor 111 may comprise one or more sensors (e.g., photodiodes, phototransistors, etc.) configured to detect intensity of light having wavelengths corresponding to those of light sources 112 and 113. In operation according to embodiments of the invention, light sources 112 and 113 may provide pulsed light emission and photosensor 111 may provide fast photo sensor sampling (e.g., sampling on the order of 100 Hz), such as may be coordinated by microcontroller unit (MCU) 121. In accordance with embodiments of the invention, optical measuring chamber 110 may be operated (e.g., under control of MCU 121) such that photosensor 111 scattered-light signals from one wavelength of the wavelengths emitted by light sources 112 and 113 at a time.

In operation of embodiments of optical measuring chamber 110, air to be sampled may enter into an internal cavity of optical measuring chamber 110 via one or more orifices (not shown) carrying particulate matter (e.g., ash and/or other particles released from burning materials, molecules of water vapor within steam from heated water, molecules of oil vapor from heated cooking oil, etc.) suspended therein. Light emitted from light sources 112 and 113 may illuminate the airborne particles and be scattered thereby, wherein some portion of scattered light from light sources 112 and 113 may impinge upon photosensor 111, facilitating generation of scattering signals utilized in smoke detection according to concepts herein.

In operation according to scattering techniques, scattering intensity is maximal when the wavelength of the light matches the particle size. Multi-wavelength scattering techniques as implemented by smoke detector 100 of embodiments utilizes a metric derived from signals generated by multiple wavelengths of scattered light, which is related to the size of particle detected, to distinguish fire and nuisances. For example, a dynamic metric having multiple dimensions utilized according to embodiments of the invention may be derived from multi-wavelength scattering signals obtained from photosensor 111 of optical measuring chamber 110 according to concepts herein. A multi-dimensional metric of embodiments may, for example, dynamically track a slope of a relationship between intensity of scattered light of the wavelengths emitted by light sources 112 and 113 impinging upon photosensor 111.

Controller 120 of smoke detector 100 provides operation for monitoring one or more multi-dimensional metrics and for multi-wavelength based smoke detection using multi-dimensional metric monitoring. For example, MCU 121 of controller 120 may comprise one or more processors operable to execute logic implementing various functions for monitoring one or more multi-dimensional metrics, for initiating alarms according to multi-dimensional metric monitoring, for resetting alarms according to multi-dimensional monitoring, etc. MCU 121 may, for example, comprise one or more general purpose processors (e.g., a processor from the CORE family of processors available from Intel, Inc., a processor from the BCM28XX family of system-on-chip (SoC) processors available from Broadcom Inc., a field programmable gate array (FPGA), etc.), one or more special purpose processors (e.g., an application specific integrated circuit (ASIC), a hardware logic array, etc.), or combinations thereof.

When implemented in software and/or firmware, the functions of logic providing aspects of multi-wavelength scattering based smoke detection using multi-dimensional metric monitoring techniques of embodiments of the present invention may comprise code segments to perform tasks as described herein. The code segments can be stored in a processor readable medium of memory 122 for execution by MCU 121. The processor readable medium may include any medium that can suitably store and transfer information. Examples of the processor readable medium of memory 122 include a semiconductor memory device, a read only memory (ROM), a flash memory, an erasable ROM (EROM), an optical disk, a hard disk, etc.

Multi-dimensional metric monitoring smoke detection logic 123 stored in memory 122 of the embodiment illustrated in FIG. 1 may, for example, provide code segments (e.g., one or more instruction set in the form of software and/or firmware code segments) for monitoring one or more multi-dimensional metrics and for multi-wavelength based smoke detection using multi-dimensional metric monitoring. Multi-dimensional metric monitoring smoke detection logic 123 of embodiments of the invention provides an algorithm for initiating a fire alarm and/or resetting the fire alarm based on monitoring a multi-dimensional metric. A multi-dimensional metric monitoring smoke detection algorithm of multi-dimensional metric monitoring smoke detection logic 123 may, for example, utilize one or more multi-dimensional thresholds of multi-dimensional threshold database 124 with respect to monitoring of the multi-dimensional metric for initiating a fire alarm and resetting the fire alarm. Using such monitoring of a multi-dimensional metric and corresponding multi-dimensional thresholds, multi-dimensional metric monitoring smoke detection logic 123 provides operation of smoke detector 100 which avoids false alarms and/or shortened resetting times after a fire is extinguished as compared to traditional implementations.

Figure 2:
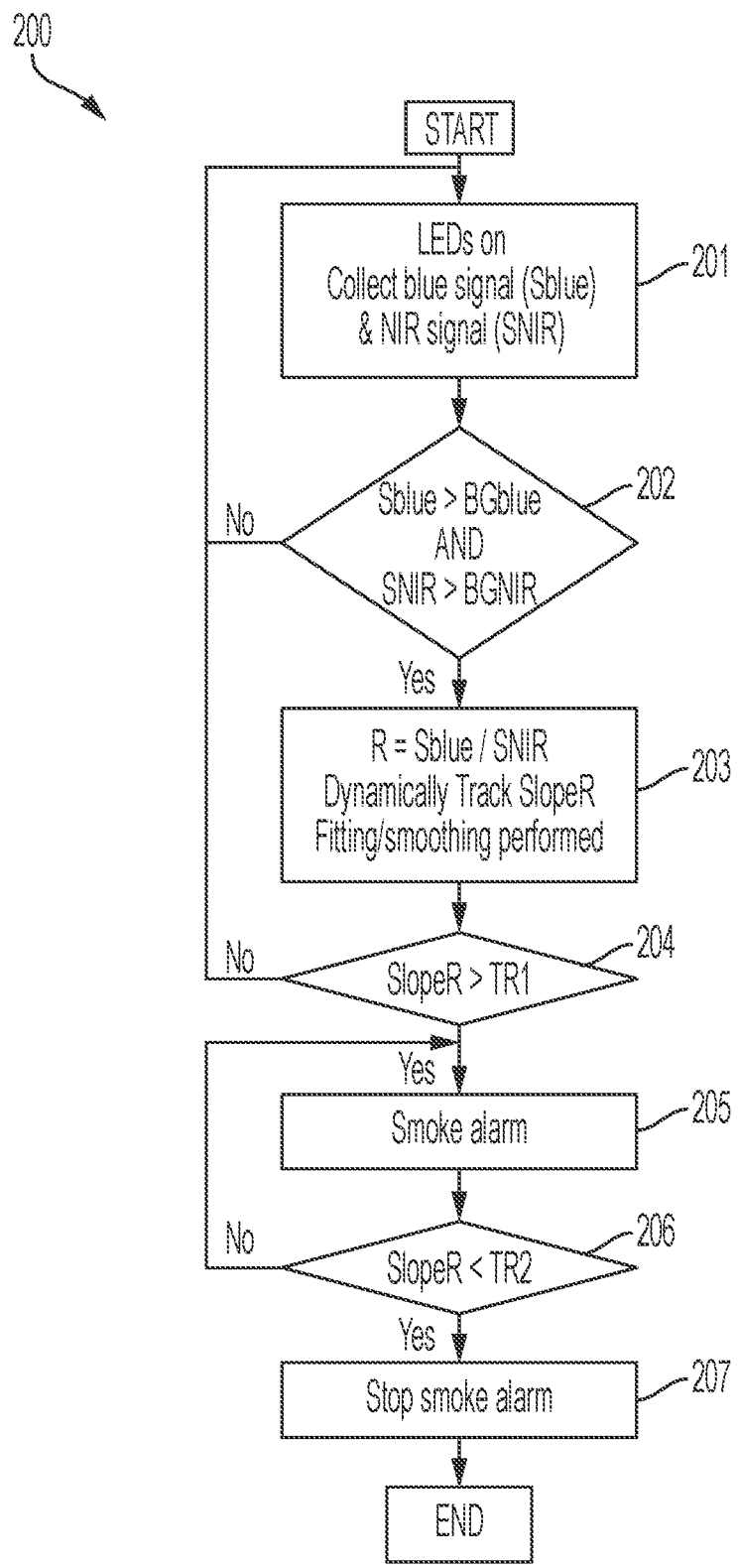
FIG. 2 shows an example flow diagram illustrating functions of a multi-dimensional metric monitoring smoke detection algorithm as may be implemented by multi-dimensional metric monitoring smoke detection logic according to embodiments of the present invention.

FIG. 2 shows flow 200 illustrating functions of a multi-dimensional metric monitoring smoke detection algorithm as may be implemented by multi-dimensional metric monitoring smoke detection logic 123 executed by MCU 121 of smoke detector 100. To aid in understanding the concepts of the present invention, the example of flow 200 is described with reference to particular implementations with respect to light wavelengths and multi-dimensional metrics. In particular, in the example of flow 200, the multiple wavelengths of light sources 112 and 113 comprise blue and near-infrared (NIR) wavelengths, wherein a ratio of blue scattered light to NIR scattered light is utilized in providing a dynamic, multi-dimensional metric monitored. It should be appreciated, however, that other wavelengths of light (e.g., particular wavelengths providing one or more scattered light metrics related to the size of particles to be detected) and/or other relationships between multi-wavelength scattering signals may be utilized according to embodiments of the invention.

At block 201 of the illustrated embodiment of flow 200, light sources 112 and 113 are operated to illuminate an air sample currently present within the interior of optical measuring chamber 110 (e.g., air from an environment in which smoke detector 100 is disposed entering into the optical measuring chamber), and photosensor 111 is operated to provide multi-wavelength scattering signals corresponding to scattered light impinging on the photosensor having wavelengths corresponding to those of light sources 112 and 113. For example, light sources 112 and 113 may provide pulsed light emission (e.g., alternating light emissions by light sources 112 and 113) and photosensor 111 may output scattering signals corresponding to scattered light impinging upon the photosensor in association with the light emissions by light sources 112 and 113. In operation according to embodiments, photosensor 111 may provide a first scattering signal (e.g., Sblue) to MCU 121 for blue scattered light impinging on the photosensor and a second scattering signal (e.g., SNIR) to MCU 121 for NIR scattered light impinging on the photosensor. As a specific example, the scattering signals may provide signals corresponding to the intensity of blue scattered light impinging on the photosensor and the intensity of NIR scattered light impinging on the photosensor.

The multi-wavelength scattering signals are analyzed at block 202 to determine if further analysis for smoke detection is to be performed with respect to the sample currently present within the interior of optical measuring chamber 110. Logic executed by MCU 121 may, for example, compare the multi-wavelength scattering signals provided by photosensor 111 to determine if the signals are above a background or smoke detection relevancy threshold (e.g., ensuring sufficient signals above backgrounds for further smoke detection analysis). In an example, a determination may be made with respect to the first scattering signal is greater than a corresponding first background level (e.g., Sblue>BGblue) and the second scattering signal is greater than a corresponding second background level (e.g., SNIR>BGNIR). Background levels may, for example, be established through operation of photosensor 111 and light sources 112 and 113 operating within optical measuring chamber 110 and smoke detector 100 disposed in a known smoke free ambient environment. In accordance with embodiments of the invention, background levels (e.g., BGblue and BGNIR) used in determining if the signals are above a smoke detection relevancy threshold may be the averages of measured signals in a known smoke free ambient environment plus 5 times the standard deviations, such as to provide background levels roughly 10% above the average background signal.

If it is determined at block 202 that further analysis for smoke detection is not to be performed using the multi-wavelength scattering signals, processing according to the illustrated example of flow 200 returns to block 201 wherein further sampling of air from the environment in which smoke detector 100 is disposed may be performed. However, if it is determined at block 202 that further analysis for smoke detection is to be performed using the scattering signals, processing according to the illustrated example of flow 200 proceeds to block 203 for further analysis for smoke detection.

At block 203 of flow 200 illustrated in FIG. 2, a multi-dimensional metric used for smoke detection analysis is processed. For example, logic executed by MCU 121 may use the multi-wavelength scattering signals provided by photosensor 111 to process a dynamic metric having multiple dimensions utilized in smoke detection analysis according to embodiments of the invention. In operation according to embodiments, a dynamic metric may be calculated based on processor-defined alternately pulsed profiles for the illumination of light sources 112 and 113 and corresponding scattered-light signals collected by photosensor 111. In an example, logic executed by MCU 121 may dynamically track a slope of a value calculated from the intensity of scattered light impinging on photosensor 111 using the multi-wavelength scattering signals. For example, the multi-dimensional metric may correspond to the ratio of scattered-light signals from one wavelength over scattered-light signals from the other wavelength. However, a multi-dimensional metric utilized in accordance with the concepts herein may comprise a different combination of signals from one wavelength with signals from the other wavelengths.

Figure 3A:
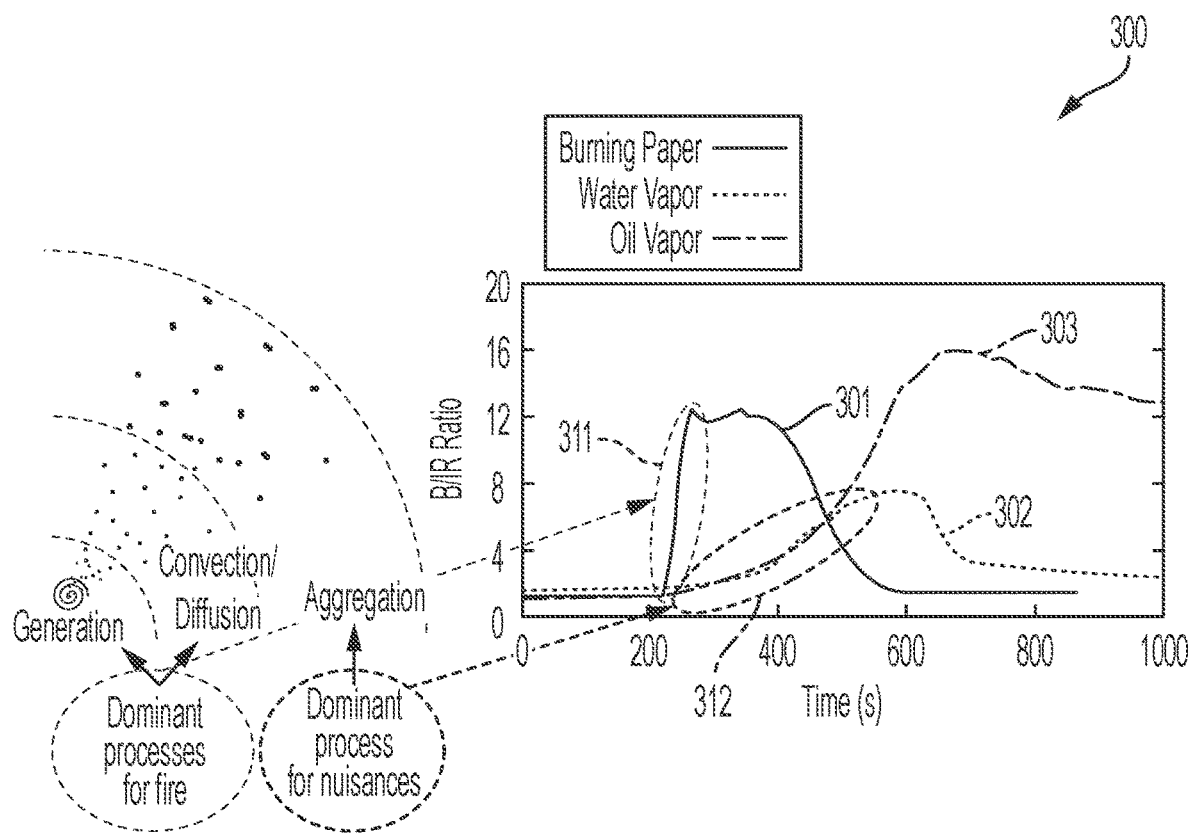
FIGS. 3A and 3B show a graph plotting values calculated from the intensity of multi-wavelength scattered light impinging on a photosensor over time for illustrating operation according to a multi-dimensional metric monitoring smoke detection algorithm according to embodiments of the present invention.

To aid in understanding the use of a multi-dimensional metric with respect to multi-wavelength based smoke detection according to embodiments of the present invention, attention is directed to FIG. 3A in which graph 300 plotting values calculated from the intensity of multi-wavelength scattered light impinging on a photosensor over time are shown. In the example of graph 300, the Blue-to-IR ratio for the intensity of blue scattered light to the intensity of NIR scattered light (e.g., as provided by photosensor 111) is plotted over time for various scenarios in which particulates are disbursed in air. In particular, plot line 301 shows a plot of Blue-to-IR ratio over a time in which paper is burned releasing ash and other particulates into the air (e.g., a fire scenario), plot line 302 shows a plot of Blue-to-IR ratio over a time in which a heated source of water releases water vapor into the air (e.g., a non-fire, nuisance scenario), and plot line 303 shows a plot of Blue-to-IR ratio over a time in which a heated source of cooking oil releases oil vapor into the air (e.g., a non-fire, nuisance scenario).

Although there are complicated processes associated with the particles released in any of the foregoing scenarios, various trends may be observed with respect to the Blue-to-IR ratio. For example, fire activity typically results in rapid generation of relatively small particles (e.g., particle sizes of less than 1 μm), accompanied by significant movement of the particles (e.g., due to convection and/or diffusion). Accordingly, as illustrated in the sidebar graphic of FIG. 3A, generation and convection/diffusion of the particulates are dominant processes in the example fire scenario. These processes generally result in a relatively steep, positive Blue-to-IR slope in the initial stage of the fire activity, as shown by the slope of the Blue-to-IR ratio of plot line 301 in area 311 of graph 300. In contrast, nuisance activity often results in relatively slow generation and movement of larger particles (e.g., particle sizes of greater than 1 μm), accompanied by particle aggregation. Accordingly, as illustrated in the sidebar graphic of FIG. 3A, aggregation of the particulates is a dominant process in the example nuisance scenarios. This process generally results in a relatively shallow, positive Blue-to-IR slope in the initial stage of the nuisance activity, as shown by the slope of plot lines 302 and 303 in area 312 of graph 300.

As can be appreciated from the plot lines for the various scenarios in graph 300, the Blue-to-IR ratio provides a mathematical combination of multi-wavelength scattering signals which is related to the size of particle detected and which may be used in analysis to distinguish fire scenarios from nuisance scenarios. Accordingly, in the example of flow 200 at block 203, MCU 121 may use the multi-wavelength scattering signals provided by photosensor 111 to compute the Blue-to-IR ratio (R) for monitoring of a changing trend. It should be appreciated however, that other mathematical combinations of multi-wavelength scattering signals which are related to the size of particle (e.g., weighted sum of the scattering signals) may be utilized according to embodiments of the invention.

Logic executed by MCU 121 may dynamically track a slope of the Blue-to-IR ratio (SlopeR) as a dynamic metric having multiple dimensions utilized in smoke detection analysis according to embodiments of the invention. Accordingly, SlopeR may be dynamically determined and tracked at block 203 of flow 200 in the illustrated example. The multi-dimensional metric SlopeR (e.g., having both orientation and magnitude dimensions) may be determined from the Blue-to-IR ratio (R) as observed over time.

Fitting and smoothing may be applied with respect to the determination of SlopeR to facilitate reliable slope measurements according to embodiments of the invention. In operation according to embodiments of the invention, logic executed by MCU 121 is dynamically monitoring a changing trend of the multi-dimensional metric by measuring metric slope with a live data fitting method. For example, complex indoor smoke flow due to convection and/or diffusion may lead to volatile sample data (e.g., volatility in the Blue-to-IR ratio values determined from the multi-wavelength scattering signals) even after averaging. One or more fitting/smoothing techniques may be implemented to prevent unstable responses due to the volatile nature of fire/nuisance samples from disturbing alarm determination. Fitting measured data into smooth curves may be implemented on top of data averaging, such as to facilitate reliable metric slope measurements configured to prevent missing alarm conditions or setting off false alarms. Embodiments of the invention may utilize continuous segmented spline fitting because of its compatibility in device implementation. For example, segmented cubic spline fitting may be performed on top of data averaging to overcome the volatile nature of samples (smoke, steam, and etc.). In performing segmented cubic spline fitting according to embodiments, for a spline with M segments ((M−1) knots), segmented cubic regression operations may be performed continuously for every (N*M−1) points in M segments starting at each knot point for cubic spline fitting with the condition of equal curvatures (continuity of the first derivative) at knot points and providing reliable calculations of slopes at knot points. Additionally or alternatively, embodiments may apply methods such as Savitzky-Golay filter, Kernel smoother, etc. for fitting measured data into smooth curves.

Figure 3B:
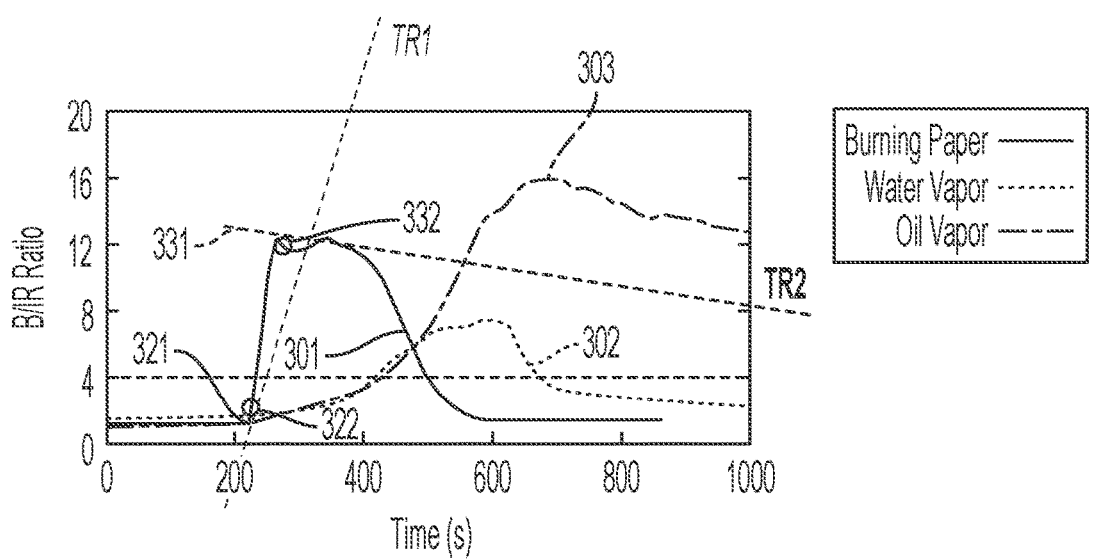

Embodiments of the present invention may utilize one or more multi-dimensional thresholds with respect to monitoring of the multi-dimensional metric for initiating a fire alarm. For example, a first multi-dimensional threshold (e.g., multi-dimensional threshold TR1 shown in FIG. 3B) may be utilized in combination with monitoring of the multi-dimensional metric (e.g., SlopeR) for identifying smoke associated with a fire event and excluding nuisances. An instance of a fire event may be associated with rapid generation of relatively small particles (e.g., particle sizes of less than 1 μm) characterized by relatively fast movement (e.g., due to convection/diffusion) resulting in a sharp B/IR ratio increase. In contrast, a nuisance event may be associated with slow generation of relatively large particles (e.g., particle sizes of greater than 1 μm) characterized by relatively slow movement and accompanied particle aggregation resulting in a gentle B/IR ratio increase. As exemplified in FIG. 3B, if the blue and NIR signals (e.g., Sblue and SNIR) are adjusted by tuning the electronic gains so that the B/IR ratio is approximately 1 (±20%) at the beginning before an air-carried sample enters the measuring chamber, SlopeR for a fire scenario would be greater than 20/(100 s) and SlopeR for a nuisance scenario would be smaller than 4/(100 s). In this example, TR1 may be set to a value (e.g., 10/(100 s)) between these two gradient magnitude limits to provide an implementation configured to differentiate fire and nuisances. Accordingly, as illustrated in FIG. 3B, multi-dimensional threshold TR1 may establish an orientation (e.g., positive slope) and a magnitude (e.g., a gradient magnitude from within the range between 20/(100 s) and 4/(100 s)) above which the slope of Blue-to-IR ratio is considered to be consistent with and indicative of a fire event. In operation according to embodiments of the invention, the monitored multi-dimensional metric (e.g., SlopeR) may be analyzed with respect to a multi-dimensional threshold (e.g., TR1) for identifying an instance of a fire event.

The particular configuration of a multi-dimensional threshold utilized with respect to monitoring of the multi-dimensional metric for initiating a fire alarm may vary depending upon a number of factors. For example, the particular environment (e.g., home, factory, office, outdoor space, kitchen, living room, bathroom, bedroom, garage, laundry room, basement, etc.), the size or volume of space, and/or the ambient temperature range of the environment in which smoke detector 100 is disposed may be considered in selecting one or more dimensions of a multi-dimensional threshold. Additionally or alternatively, the types of media likely to be involved in a fire event, the amount of flammable material within the area of the smoke detector, and/or the types of non-fire related particulates the smoke detector is likely to be exposed to may be considered in selecting one or more dimensions of a multi-dimensional threshold. As a further example, user's tolerance for potential false alarms, the user's tolerance for potential missed fire events, and/or user preference for how quickly an alert for a putative fire event is initiated may additionally or alternatively be considered in selecting one or more dimensions of a multi-dimensional threshold. Accordingly, the particular configuration of one or more dimensions of multi-dimensional threshold TR1 utilized according to embodiments of the invention may be selected based upon one or more such factors. For example, a magnitude dimension of TR1 may be adjusted/selected based upon some or all of the foregoing considerations. In accordance with embodiments of the invention, multi-dimensional threshold TR1 may be adjustable to fit various situations (e.g., smoke alarm 100 being disposed in a home kitchen, a restaurant kitchen, etc.).

In accordance with aspects of the invention, one or more configurations of multi-dimensional thresholds may be stored for use by smoke detector 100. For example, a multi-dimensional threshold database (e.g., multi-dimensional threshold database 124 of FIG. 1) may be provided with respect to smoke detector 100, whereby the first multi-dimensional threshold (e.g., multi-dimensional threshold TR1) may be obtained for use in combination with monitoring of the multi-dimensional metric (e.g., SlopeR) for identifying smoke associated with a fire event and excluding nuisances. In a situation in which multiple configurations of multi-dimensional thresholds are stored by the multi-dimensional threshold database, a particular one of the multi-dimensional thresholds may be selected for use as the first multi-dimensional threshold through a configuration process. In one example, a user or installer of smoke detector 100 may provide information regarding various considerations, such as those described above, whereby logic executed by MCU 121 designates an appropriate one of the multi-dimensional thresholds for use in light of the considerations. In another example, a manufacturer may provide information regarding particular multi-dimensional thresholds to be selected in light of certain considerations, whereby a user or installer may designate the particular multi-dimensional threshold based upon the manufacturer provided information.

Referring again to flow 200 of FIG. 2, at block 204 of the illustrated example, the multi-dimensional metric monitored for smoke detection analysis according to embodiments of the invention may be compared to the first multi-dimensional threshold for determining if the observed trend regarding particulates in the air sampled is indicative of smoke corresponding to a fire event. For example, logic executed by MCU 121 may analyze the slope of Blue-to-IR ratio (SlopeR) with respect to multi-dimensional threshold TR1 to determine if the monitored slope is greater than the threshold slope (e.g., SlopeR>TR1). A fire event may begin at point 321 shown in FIG. 3B, resulting in the slope of the Blue-to-IR ratio increasing rapidly due to convection/diffusion of the particulates. By analyzing the monitored multi-dimensional metric SlopeR with respect to multi-dimensional threshold TR1 (e.g., determining if SlopeR>TR1), logic executed by MCU 121 may identify the fire event of plot line 301 at region 322, very soon after initiation of the fire event (e.g., using sampling rates up to 100 Hz with data averaging). Moreover, it can be seen in graph 300 of FIG. 3B that the slopes of the Blue-to-IR ratio of plot lines 302 and 303 for the example nuisance events (e.g., water vapor and oil vapor) are never greater than the multi-dimensional threshold TR1, and thus false detection of fire events may be avoided according to embodiments of the invention. In contrast, if a static, single dimensional threshold (e.g., Blue-to-IR ratio (R)=4, as indicated by the horizontal dotted line in FIG. 3B) were used to determine the presence of particles having a size indicative of smoke, not only would the fire event of plot line 301 be identified much later than with the multi-dimensional metric of the example embodiment, but false alarms with respect to nuisance events are likely (e.g., as shown by plot lines 302 and 303 reaching the example static, single dimensional threshold).

If it is determined at block 204 that the monitored multi-dimensional metric is not indicative of a fire event, processing according to the illustrated example of flow 200 returns to block 201 wherein further sampling of air from the environment in which smoke detector 100 is disposed may be performed (e.g., processing according to blocks 201-203 may be repeated for dynamically track a slope of a value calculated from the intensity of scattered light impinging on photosensor 111 using the multi-wavelength scattering signals). However, if it is determined at block 204 that the monitored multi-dimensional metric is indicative of a fire event, processing according to the illustrated example of flow 200 proceeds to block 205 for further processing consistent with a fire event being indicated.

At block 205 of flow 200 illustrated in FIG. 2, a fire alert is provided in response to a fire event having been identified. For example, logic executed by MCU 121 may provide a control signal to alerting device 130 for initiating an alert. Alerting device 130 may, for example, comprise an audio alert device (e.g., a siren, a klaxon, a horn, a speaker, a bell, a buzzer, etc.) which is controlled to sound an audio alert. Additionally or alternatively, alerting device 130 may comprise a communication device (e.g., wireless terminal, electronic mail client, telephony device, etc.) which is controlled to transmit one or more alert messages.

Embodiments of the present invention may utilize one or more multi-dimensional thresholds with respect to monitoring of the multi-dimensional metric for resetting a fire alarm and/or resetting the fire alarm. For example, a second multi-dimensional threshold (e.g., multi-dimensional threshold TR2 shown in FIG. 3B) may be utilized in combination with monitoring of the multi-dimensional metric (e.g., SlopeR) for identifying retrogression of smoke associated with termination of a fire event. As exemplified in FIG. 3B, the range of TR2 can be 0/(100 s) to −4/(100 s), although a value of 0/(100 s) may not be recommended for practical implementations. In this example, TR2 may be set to a value (e.g., −2/(100 s)) between these two gradient magnitude limits to provide an implementation configured for shortened resetting times. Accordingly, as illustrated in FIG. 3B, multi-dimensional threshold TR2 may establish an orientation (e.g., negative slope) and a magnitude (e.g., a gradient magnitude from within the range between 0/(100 s) and 4/(100 s)) below which the slope of Blue-to-IR ratio is considered to be consistent with and indicative of termination of a fire event. In operation according to embodiments of the invention, the monitored multi-dimensional metric (e.g., SlopeR) may be analyzed with respect to a multi-dimensional threshold (e.g., TR2) for identifying termination of an instance of a fire event.

The particular configuration of a multi-dimensional threshold utilized with respect to monitoring of the multi-dimensional metric for terminating a fire alarm may vary depending upon a number of factors, such as those described above with respect to the multi-dimensional threshold utilized with respect to monitoring the multi-dimensional metric for initiating a fire alarm. Accordingly, the particular configuration of one or more dimensions of multi-dimensional threshold TR2 utilized according to embodiments of the invention may be selected based upon one or more such factors. For example, a magnitude dimension of TR2 may be adjusted/selected based upon some or all of the foregoing considerations. In accordance with embodiments of the invention, multi-dimensional threshold TR2 may be adjustable to fit various situations (e.g., smoke alarm 100 being disposed in a home kitchen, a restaurant kitchen, etc.).

In an embodiment where one or more configurations of multi-dimensional thresholds are stored for use by smoke detector 100 (e.g., within multi-dimensional threshold database 124 of FIG. 1), whereby the second multi-dimensional threshold (e.g., multi-dimensional threshold TR2) may be obtained for use in combination with monitoring of the multi-dimensional metric (e.g., SlopeR) for identifying retrogression of smoke associated with termination of a fire event. In a situation in which multiple configurations of multi-dimensional thresholds are stored by the multi-dimensional threshold database, a particular one of the multi-dimensional thresholds may be selected for use as the second multi-dimensional threshold through a configuration process, such as those described above.

Referring again to flow 200 of FIG. 2, at block 206 of the illustrated example, the multi-dimensional metric monitored for smoke detection analysis according to embodiments of the invention may be compared to the second multi-dimensional threshold for determining if the observed trend regarding particulates in the air sampled is indicative of smoke abatement consistent with termination of a fire event. For example, logic executed by MCU 121 may analyze the slope of Blue-to-IR ratio (SlopeR) with respect to multi-dimensional threshold TR2 to determine if the monitored slope is less than the threshold slope (e.g., SlopeR<TR2). For example, a fire event may terminate at point 331 shown in FIG. 3B, resulting in the slope of the Blue-to-IR ratio decreasing appreciably due to dissipation of the particulates. By analyzing the monitored multi-dimensional metric SlopeR with respect to multi-dimensional threshold TR2 (e.g., determining if SlopeR<TR2), logic executed by MCU 121 may identify the termination of the fire event of plot line 301 at region 332, very soon after termination of the fire event. It can be seen in graph 300 of FIG. 3B that identification of termination of the fire event based upon multi-dimensional threshold TR2 is considerably earlier than would result from the use of a static, single dimensional threshold (e.g., Blue-to-IR ratio (R)=4, as indicated by the horizontal dotted line in FIG. 3B) that may be used to determine the presence of particles having a size indicative of smoke.

If it is determined at block 206 that the monitored multi-dimensional metric is not indicative of termination of the fire event, processing according to the illustrated example of flow 200 returns to block 202 wherein the fire alert is continued. However, if it is determined at block 206 that the monitored multi-dimensional metric is indicative of termination of the fire event, processing according to the illustrated example of flow 200 proceeds to block 207 for further processing consistent with termination of a fire event being indicated.

At block 207 of flow 200 illustrated in FIG. 2, a fire alert provided in response to a fire event having been identified is reset. For example, logic executed by MCU 121 may provide a control signal to alerting device 130 for terminating an alert. In a scenario where alerting device 130 comprises an audio alert device (e.g., a siren, a klaxon, a horn, a speaker, a bell, a buzzer, etc.), for example, the audio alert device may be controlled to terminate an audio alert. Additionally or alternatively, in a scenario where alerting device 130 comprises a communication device (e.g., wireless terminal, electronic mail client, telephony device, etc.), the communication device may be controlled to transmit one or more alert end messages.

The example of flow 200 illustrated in FIG. 2 shows an end to the flow after terminating an alert at block 207. It should be appreciated, however, that in operation according to embodiments of smoke detector 100, processing may return to block 201 for further sampling of air from the environment in which smoke detector 100 is disposed to provide continued operation for smoke detection (e.g., initiating alarms with respect to subsequent fire events).

It should be appreciated from the above description of the example of flow 200, embodiments of the present invention may implement an algorithm for fire alarm and resetting based on dynamically tracking the slope of a multi-dimensional metric calculated by incorporating scattered light of multiple wavelengths (e.g., blue scattered light intensity and NIR scattered light intensity). Using such a multi-dimensional metric (e.g., slope of Blue-to-IR ratio), which is related to the size of particle detected, in combination with corresponding multi-dimensional thresholds (e.g., TR1 and TR2) according to embodiments of the invention facilitates distinguishing fire and nuisances as well as accurate and rapid alarm resetting. Moreover, such fire alarm and resetting based on a multi-dimensional metric according to concepts of the present invention is enabled through the use of scattering signals acquired from an optical measuring chamber, without the need for additional sensors or measurements. Accordingly, embodiments of smoke detector 100 may be implemented with fewer components than conventional smoke detectors using two wavelengths of scattered light, thus facilitating easier fabrication, reduced price, etc. as a result of no additional sensors.

The ability to obtain a plurality of data points having sufficient signal, rather than noise, facilitates the generation and tracking of a dynamic metric having multiple dimensions derived from multi-wavelength scattering signals according to embodiments of the invention. Accordingly, an optical measuring chamber of embodiments may be configured to facilitate collection of a series of (e.g., consecutive) data points having satisfactory signal to noise characteristics, and eliminating angle dependence. For example, optical measuring chamber 110 may be configured for wide-scattering-angle signal collection for facilitating generation and tracking of a multi-dimensional metric according to concepts herein. In contrast to conventional narrow-scattering-angle signal collection of scattering signals typically implemented by prior optical measuring chambers (e.g., providing low throughput and convoluted angle dependence for nuisances (large particles) and causing invalid data points and unreliable multi-dimensional metric calculations), wide-scattering-angle signal collection configurations of embodiments of the invention facilitate collection of a plurality of data points with sufficient signal (e.g., Blue signal and NIR signal compared to background level) for ensuring sufficient signals above backgrounds and eliminated angle dependence.

Figure 4A:
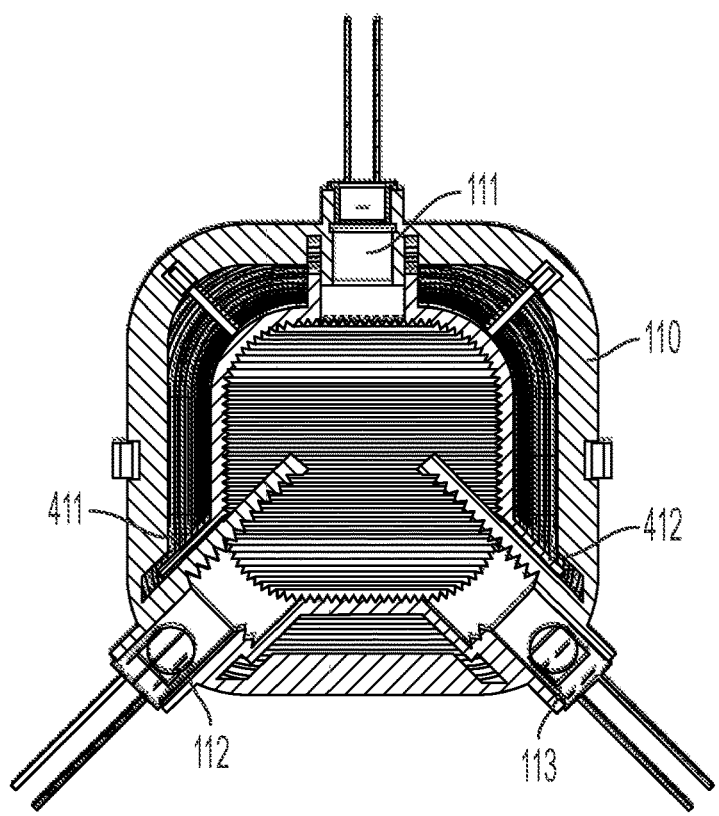
FIGS. 4A and 4B show an optical measuring chamber configured for wide-scattering-angle signal collection according to embodiments of the present invention.
Figure 4B:
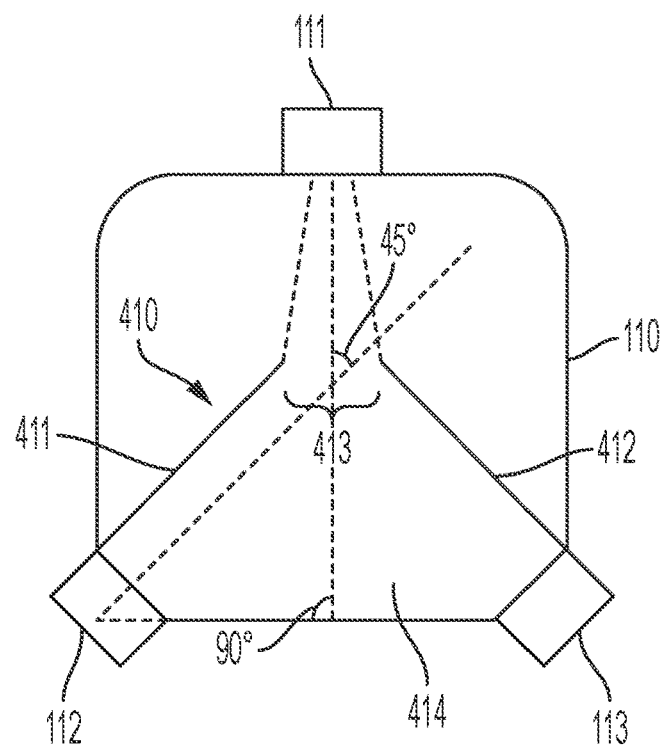

FIGS. 4A and 4B show an embodiment of optical measuring chamber 110 configured for wide-scattering-angle signal collection. The embodiment of FIGS. 4A and 4B provides a configuration in which a light trapping sub-chamber is defined inside the smoke chamber for wide-scattering-angle signal collection for facilitating metric slope measurements by collecting the total signal from a wide scattering angle.

In the example of FIGS. 4A and 4B, light-guide diaphragm 410 comprises light-guide plates 411 and 412 disposed to define light trapping sub-chamber 414 (e.g., a triangle sub-chamber configuration) and light-guide orifice 413. Light-guide plates 411 and 412 may, for example, comprise metal, plastic, acrylic, and/or other material having a surface (e.g., light absorbing, rough, and/or dark surface) configured for preventing unintentional reflection of light emitted by light sources 112 and 113 into photosensor 111 (e.g., permitting essentially only light scattered by particulates carried by air into the light trapping sub-chamber to impinge upon the photosensor). Light-guide plates 411 and 412 may be arranged and aligned to form light trapping sub-chamber 414 where light scattering occurs. In accordance with embodiments, light-guide plates 411 and 412 and light-guide orifice 413 are configured such that light emitted by light sources 112 and 113 does not directly impinge upon photosensor 111, although light scattered within light trapping sub-chamber 414 may exit light-guide orifice 413 and thus indirectly impinge upon photosensor 111. The surfaces of light-guide plates 411 and 412 facing light trapping sub-chamber 414 may include angular discontinuities (e.g., a "saw-tooth" ridge pattern and/or other surface angularities) for promoting light absorption of light within light trapping sub-chamber 414. Accordingly, light-guide diaphragm 410 may provide a large effective scattering area for wide-scattering-angle signal collection by photosensor 111.

Figure 5:
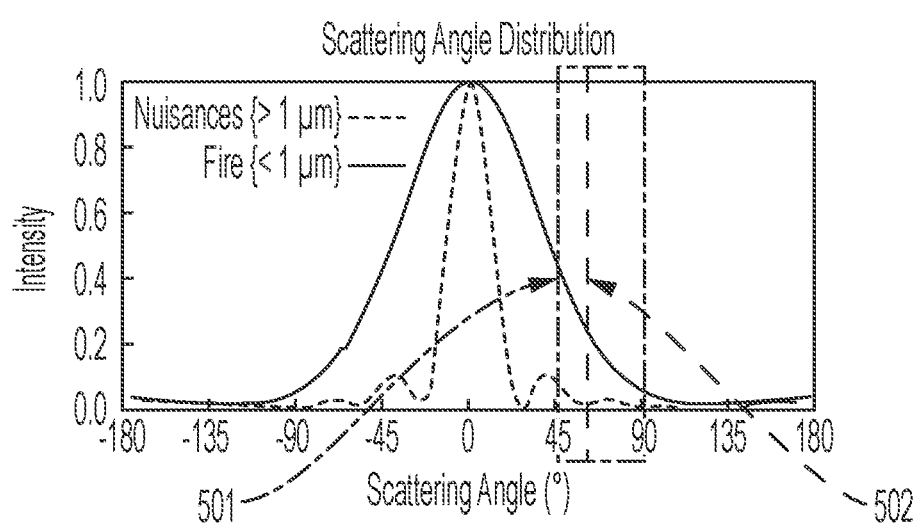
FIG. 5 shows a scattering angle distribution graph illustrating wide-scattering-angle signal collection according to embodiments of the present invention.

As shown in the scattering angle distribution graph of FIG. 5, light-guide diaphragm 410 configured according to the example of FIGS. 4A and 4B enables a scattering signal from 45° to 90° to be collected (e.g., scattered light from scattering angles in the range of 45°-90°, as designated by box 501 of FIG. 5). Such wide-scattering-angle signal collection may be utilized to provide consecutive data points with sufficient signal and eliminated angle dependence for facilitating meaningful multi-dimensional metric tracking according to embodiments of the present invention. In contrast to the wide-scattering-angle signal collection of the example embodiment above, conventional optical measurement chambers provide narrow-scattering-angle signal collection (e.g., scattered light from a single or very narrow range of scattering angles, as designated by box 502 of FIG. 5). Such narrow-scattering-angle signal collection often results in low throughput and convoluted angle dependence for nuisances (large particles), causing invalid data points and unreliable calculations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for detecting smoke, the method comprising:
   obtaining a first scattered light signal for a first wavelength of light;
   obtaining a second scattered light signal for a second wavelength of light, wherein the first scattered light signal and the second scattered light signal are obtained from an optical measurement chamber configured for wide-scattering-angle signal collection, wherein the optical measurement chamber comprises a first light source, a second light source, and a photosensor, wherein the first light source and the second light source are disposed in association with a light-guide diaphragm defining a light trapping sub-chamber within the optical measurement chamber and are illuminated according to alternately pulsed profiles, and wherein the photosensor receives scattered light corresponding to the first scattered light signal and scattered light corresponding to the second scattered light signal separately over time;
   computing a value based on a ratio of the first scattered light signal and the second scattered light signal;
   computing a multi-dimensional metric based on the value computed based on the ratio of the first scattered light signal and the second scattered light signal over time;
   comparing the multi-dimensional metric to a first multi-dimensional threshold; and
   determining if presence of smoke is indicated based on the comparing the multi-dimensional metric to the first multi-dimensional threshold.

2. The method of claim 1, wherein the multi-dimensional metric comprises a slope of the ratio of the first scattered light signal and the second scattered light signal, wherein the first multi-dimensional threshold comprises a slope predetermined for indicating presence of smoke, and wherein the determining if presence of smoke is indicated comprises determining if the slope of the ratio of the first scattered light signal and the second scattered light signal is greater than the slope predetermined for indicating presence of smoke.

3. The method of claim 1, wherein computing the multi-dimensional metric comprises:
   applying a curve fitting procedure with respect to the value based on the ratio of the first scattered light signal and the second scattered light signal.

4. The method of claim 1, further comprising:
   comparing the multi-dimensional metric to a second multi-dimensional threshold; and
   determining if smoke abatement is indicated based on the comparing the multi-dimensional metric to the second multi-dimensional threshold.

5. The method of claim 4, wherein the multi-dimensional metric comprises a slope of the ratio of the first scattered light signal and the second scattered light signal, wherein the second multi-dimensional threshold comprises a slope predetermined for indicating smoke abatement, and wherein the determining if smoke abatement is indicated comprises determining if the slope of the ratio of the first scattered light signal and the second scattered light signal is less than the slope predetermined for indicating smoke abatement.

6. A system for detecting smoke, the system comprising:
   a first light source configured for emitting light having a first wavelength;
   a second light source configured for emitting light having a second wavelength;
   a photosensor configured for outputting a first scattered light signal corresponding to scattered light having the first wavelength impinging on the photosensor and a second scattered light signal corresponding to scattered light having the second wavelength impinging on the photosensor;
   an optical measurement chamber housing the first light source, the second light source, and the photosensor, wherein the first light source, the second light source, and the photosensor are disposed in a wide-scattering-angle signal collection configuration with respect to the optical measurement chamber;
   a light-guide diaphragm defining a light trapping sub-chamber within the optical measurement chamber, wherein the first light source and the second light source are disposed in association with the light-guide diaphragm so as to provide illumination of the photosensor only by scattered light; and
   a processor executing logic configured for computing a value based on a ratio of the first scattered light signal and the second scattered light signal, computing a multi-dimensional metric based on the value computed based on the ratio of the first scattered light signal and the second scattered light signal over time, comparing the multi-dimensional metric to a first multi-dimensional threshold, and determining if presence of smoke is indicated based on the comparing the multi-dimensional metric to the first multi-dimensional threshold.

7. The system of claim 6, wherein the wide-scattering-angle signal collection comprises collection of scattered light signals having scattering angles throughout a range of 45° to 90°.

8. The system of claim 6, wherein the light-guide diaphragm comprises:
   a first light-guide plate disposed in association with the first light source;
   a second light-guide plate disposed in association with the second light source, wherein the first light-guide plate and the second light-guide plate cooperate to form a light-guide orifice in juxtaposition with the photosensor.

9. The system of claim 8, wherein the processor is further executing logic configured for illuminating the first light source and the second light source according to alternately pulsed profiles, and wherein the photosensor receives scattered light corresponding to the first scattered light signal and scattered light corresponding to the second scattered light signal separately over time.

10. The system of claim 6, wherein the multi-dimensional metric comprises a slope of the ratio of the first scattered light signal and the second scattered light signal, wherein the first multi-dimensional threshold comprises a slope predetermined for indicating presence of smoke, and the processor executing logic configured for determining if presence of smoke is indicated is executing logic configured for determining if the slope of the ratio of the first scattered light signal and the second scattered light signal is greater than the slope predetermined for indicating presence of smoke.

11. The system of claim 6, wherein the processor executing logic configured for computing the multi-dimensional metric is executing logic configured for applying a curve fitting procedure with respect to the value based on the ratio of the first scattered light signal and the second scattered light signal.

12. The system of claim 6, wherein the processor is further executing logic configured for comparing the multi-dimensional metric to a second multi-dimensional threshold, and determining if smoke abatement is indicated based on the comparing the multi-dimensional metric to the second multi-dimensional threshold.

13. The system of claim 12, wherein the multi-dimensional metric comprises a slope of the ratio of the first scattered light signal and the second scattered light signal, wherein the second multi-dimensional threshold comprises a slope predetermined for indicating smoke abatement, and wherein processor executing logic configured for determining if smoke abatement is indicated is executing logic configured for determining if the slope of the ratio of the first scattered light signal and the second scattered light signal is less than the slope predetermined for indicating smoke abatement.

14. A system for detecting smoke, the system comprising:
an optical measurement chamber having a first light source, a second light source, and a photosensor disposed in a wide-scattering-angle signal collection configuration, wherein the first light source is configured for emitting light having a first wavelength and the second light source is configured for emitting light having a second wavelength, and wherein the photosensor is configured for outputting a first scattered light signal corresponding to scattered light having the first wavelength impinging on the photosensor and a second scattered light signal corresponding to scattered light having the second wavelength impinging on the photosensor, wherein the optical measurement chamber further has a first light-guide plate disposed in association with the first light source and a second light-guide plate disposed in association with the second light source, wherein the first light-guide plate and the second light-guide plate cooperate to form a light-guide orifice in juxtaposition with the photosensor, wherein the first light source and the second light source are disposed in association with the first and second light-guide plates so as to provide only indirect illumination of the photosensor; and
a processor executing logic configured for computing a multi-dimensional metric corresponding to a slope of a ratio of the first scattered light signal and the second scattered light signal, comparing the multi-dimensional metric to a first multi-dimensional threshold corresponding to a slope predetermined for indicating presence of smoke, and determining if presence of smoke is indicated based on the comparing the multi-dimensional metric to the first multi-dimensional threshold.

15. The system of claim 14, wherein the processor is further executing logic configured for comparing the multi-dimensional metric to a second multi-dimensional threshold corresponding to a slope predetermined for indicating smoke abatement, and determining if smoke abatement is indicated based on the comparing the multi-dimensional metric to the second multi-dimensional threshold.

16. A method for detecting smoke, the method comprising:
obtaining a first scattered light signal for a first wavelength of light;
obtaining a second scattered light signal for a second wavelength of light;
computing a value based on a ratio of the first scattered light signal and the second scattered light signal;
computing a multi-dimensional metric based on the value computed based on the ratio of the first scattered light signal and the second scattered light signal over time, wherein the multi-dimensional metric comprises a slope of the ratio of the first scattered light signal and the second scattered light signal;
comparing the multi-dimensional metric to a first multi-dimensional threshold, wherein the first multi-dimensional threshold comprises a slope predetermined for indicating presence of smoke; and
determining if presence of smoke is indicated based on the comparing the multi-dimensional metric to the first multi-dimensional threshold, wherein the determining if presence of smoke is indicated comprises determining if the slope of the ratio of the first scattered light signal and the second scattered light signal is greater than the slope predetermined for indicating presence of smoke.

17. A method for detecting smoke, the method comprising:
obtaining a first scattered light signal for a first wavelength of light;
obtaining a second scattered light signal for a second wavelength of light;
computing a value based on a ratio of the first scattered light signal and the second scattered light signal;
computing a multi-dimensional metric based on the value computed based on the ratio of the first scattered light signal and the second scattered light signal over time, wherein the multi-dimensional metric comprises a slope of the ratio of the first scattered light signal and the second scattered light signal;
comparing the multi-dimensional metric to a first multi-dimensional threshold;
determining if presence of smoke is indicated based on the comparing the multi-dimensional metric to the first multi-dimensional threshold;
comparing the multi-dimensional metric to a second multi-dimensional threshold, wherein the second multi-dimensional threshold comprises a slope predetermined for indicating smoke abatement; and
determining if smoke abatement is indicated based on the comparing the multi-dimensional metric to the second multi-dimensional threshold, wherein the determining if smoke abatement is indicated comprises determining if the slope of the ratio of the first scattered light signal and the second scattered light signal is less than the slope predetermined for indicating smoke abatement.

18. A system for detecting smoke, the system comprising:
a first light source configured for emitting light having a first wavelength;
a second light source configured for emitting light having a second wavelength;
a photosensor configured for outputting a first scattered light signal corresponding to scattered light having the first wavelength impinging on the photosensor and a second scattered light signal corresponding to scattered light having the second wavelength impinging on the photosensor; and
a processor executing logic configured for computing a value based on a ratio of the first scattered light signal and the second scattered light signal, computing a multi-dimensional metric based on the value computed based on the ratio of the first scattered light signal and the second scattered light signal over time, comparing the multi-dimensional metric to a first multi-dimensional threshold, and determining if presence of smoke is indicated based on the comparing the multi-dimensional metric to the first multi-dimensional threshold, wherein the multi-dimensional metric comprises a slope of the ratio of the first scattered light signal and the second scattered light signal, wherein the first multi-dimensional threshold comprises a slope predetermined for indicating presence of smoke, and the processor executing logic configured for determining if presence of smoke is indicated is executing logic configured for determining if the slope of the ratio of the first scattered light signal and the second scattered light signal is greater than the slope predetermined for indicating presence of smoke.

19. A system for detecting smoke, the system comprising:
a first light source configured for emitting light having a first wavelength;
a second light source configured for emitting light having a second wavelength;
a photosensor configured for outputting a first scattered light signal corresponding to scattered light having the first wavelength impinging on the photosensor and a second scattered light signal corresponding to scattered light having the second wavelength impinging on the photosensor; and
a processor executing logic configured for computing a value based on a ratio of the first scattered light signal and the second scattered light signal, computing a multi-dimensional metric based on the value computed based on the ratio of the first scattered light signal and the second scattered light signal over time, comparing the multi-dimensional metric to a first multi-dimensional threshold, and determining if presence of smoke is indicated based on the comparing the multi-dimensional metric to the first multi-dimensional threshold, wherein the processor is further executing logic configured for comparing the multi-dimensional metric to a second multi-dimensional threshold, and determining if smoke abatement is indicated based on the comparing the multi-dimensional metric to the second multi-dimensional threshold, wherein the multi-dimensional metric comprises a slope of the ratio of the first scattered light signal and the second scattered light signal, wherein the second multi-dimensional threshold comprises a slope predetermined for indicating smoke abatement, and wherein processor executing logic configured for determining if smoke abatement is indicated is executing logic configured for determining if the slope of the ratio of the first scattered light signal and the second scattered light signal is less than the slope predetermined for indicating smoke abatement.

* * * * *